United States Patent
Schrodt

[15] 3,704,634
[45] Dec. 5, 1972

[54] INFINITELY VARIABLE CONE PULLEY TRANSMISSION

[72] Inventor: Rudolf Schrodt, Kronberg, Germany

[73] Assignee: Reimers Getriebe A.G., Zug, Switzerland

[22] Filed: April 21, 1971

[21] Appl. No.: 135,988

[30] Foreign Application Priority Data

April 24, 1970 Germany..................P 20 19 848.5

[52] U.S. Cl..........................................74/230.17 F
[51] Int. Cl..............................................F16h 55/52
[58] Field of Search..............74/230.17 F, 230.17 A

[56] References Cited

UNITED STATES PATENTS

| | | | |
|---|---|---|---|
| 3,280,649 | 10/1968 | Bruet | 74/230.17 F |
| 3,600,960 | 8/1971 | Karig | 74/230.17 F |
| 3,600,961 | 8/1971 | Rattunde | 74/230.17 F |
| 3,618,413 | 11/1971 | Cherpes | 74/230.17 F |

*Primary Examiner*—C. J. Jusar
*Attorney*—Jennings Bailey, Jr.

[57] ABSTRACT

In an infinitely variable cone pulley transmission the cone pulley pair on one of the two shafts (driving or driven) is pressed together by a helical coil spring and on the other shaft by a hydraulic force. On the hydraulically operated side the axially displaceable cone disc and the transmission shaft form together a cylinder and piston arrangement. A particularly compact dimensioning of the transmission and the control device is achieved by arranging the pressure pump housing immediately adjacent the transmission housing. The pressure pump housing contains in one block a slide valve for regulating the hydraulic pressure, lines for guiding the pressure liquid, first mechanical elements for automatically sensing and controlling the transmission ratio, and second mechanical means for manually overriding the automatically adjusted ratio.

7 Claims, 6 Drawing Figures

INVENTOR
RUDOLF SCHRODT
BY
Jennings Bailey

INFINITELY VARIABLE CONE PULLEY TRANSMISSION

BACKGROUND OF THE INVENTION

The invention relates to an infinitely variable cone pulley transmission which comprises one pair of cone pulleys on the driving shaft and one pair of cone pulleys on the driven shaft and an endless transmitting member rotating therebetween. At least one cone disc in each pair of pulleys is displaceable on the shaft in axial direction of clamping the transmitting member between them and the pressure exerted on the cone pulley pairs in axial direction for clamping the transmitting member between them is generated on one side, i.e., either on the driving side or on the driven side, by hydraulic means and on the other side by mechanical means. On the hydraulically operated side the shaft and a portion of the axially displaceable cone disc form together a cylinder/piston arrangement to which the hydraulic liquid is transported by a pump through a control valve. The control valve is adjustable both automatically for maintaining or for changing the pre-established transmission ratio and manually for overriding the established ratio.

Infinitely variable cone pulley transmissions of the above type are already disclosed in the German Pat. No. 1 081 733. The pressure in axial direction on the pulley pair on one side is in the known transmissions generated mechanically in dependence on the torque and on the transmission ratio by cam sleeves having a rising cam gradient. One part of the sleeves is stationary on the shaft and the other is connected to the movable cone disc, and roller members are inserted between the cams.

Further, there are infinitely variable cone pulley transmissions disclosed in the German laid-open Pat. application No. 1 264 196 which comprises means for generating the axial pressure exerted on the cone pulley pairs on the driving and on the driven side hydraulically in dependence on the torque and on the transmission ratio. The hydraulic liquid on both sides is supplied to the cylinder/piston aggregate through a control valve having a square valve stem. The valve stem is adjustable both automatically by the displaceable cone disc and also manually. Further, there is a reducing valve required in the feed-back line from the control valve to the pump for reducing the pressure generated by the pump and the control valve on the driving side of the hydraulic unit.

For controlling an infinitely variable cone pulley transmission hydraulically there are required, besides the cylinder/piston aggregate, at least one pump complete with drive means, a control device including a safety valve, a reducing valve, a piston valve, means for adjusting the transmission to a nominal transmission ratio, sensing means for sensing the actual transmission ratio, and means for introducing the hydraulic liquid into the revolving shaft of the transmission side to be controlled. In the prior-art-transmissions all these elements are assembled in at least three different groups. For this reason an extra number of complicated parts are required for proper operation. All these elements and parts are complicated in design and expensive in manufacture. Besides, a noticeable amount of space is needed for these groups. But with the known transmissions these disadvantages are not of great significance because those transmissions are high-duty transmissions which, for utmost utilization of the material, must operate very exactly and with as little a safety margin as possible.

However, for uses where only little or average duty is demanded, an inexpensive and easily maintained yet reliably operating cone pulley transmission is required. Such uses are, for example, farming machinery like tractors, harvesting machines etc. for which the known mechanically operated control devices with hand wheel and set spindle are not suitable because of the great force needed for setting and because of the time-consuming and complicated setting procedure. Much better for such uses are hydraulically operating control devices which need only a small force for moving the control elements. But the known hydraulically controlled transmissions cannot be used because, as pointed out above, they are too unwieldly and too expensive to be applied with a low-duty, inexpensive transmission.

It is, therefore, an object of the present invention to provide a simple and uncomplicated infinitely variable cone pulley transmission with a hydraulical control device without making the transmission complicated and expensive, so that the latter will be suitable for application with a number of machines which require only an average-duty but reliable transmission.

SUMMARY OF THE INVENTION

The above stated object is attained by generating the pressure on the cone discs in axial direction on one side of the transmission by a helical coil spring and on the other side by hydraulic control means. On the hydraulically controlled side simplifications are achieved by mounting the pump shaft coaxially with the transmission shaft and connecting both for joint rotation, and by arranging the pump housing immediately adjacent the transmission housing with both housings being connected to form one block. The pump housing is at the same time the housing of the control valve. A further housing, again mounted immediately adjacent the transmission housing and the pump housing, contains a feeler member which extends in axial direction through the hollow pump shaft, and which with one end in engagement with the axially displaceable cone disc and with the other end is with the control valve. An additional lever is provided in the housing for manually adjusting the control valve. The lines of the hydraulic liquid are formed by holes and recesses in the transmission shaft, in the pump shaft, in the transmission housing, in the pump housing, and also in the further housing. The pump shaft extends into the same bore in the transmission shaft which also conducts the hydraulic liquid.

In the control device according to the invention all elements which are necessary for hydraulically controlling one side of the transmission are incorporated in one unit which needs only little space and comprises only a minimum of single parts. The unit to a great extent makes use of the elements and the space thereof which have to be present in any case. Besides, the problem of conducting the hydraulic liquid through the revolving shaft into the cylinder/piston aggregate has been solved in a simple manner. The pump shaft and the transmission shaft rotate at an equal number of revolutions per minute so that the problem of introducing the hydraulic liquid from a stationary element into a rotating element has been avoided, thus also avoiding any relative movement at the seal between these two elements. Further, there are no additional elements required for driving the pump shaft, such as gears, chains, belts etc.

A further advantage of the invention is that the feeler member and the levers for sensing and adjusting the preselected transmission ratio are short and practically free from elasticity. The cooperation between the axially displaceable cone disc, the feeler member and the control valve is therefore very exact and without time delay. Besides, since most of the lines of the hydraulic liquid are formed by the gear elements themselves all movable parts are arranged in the flow of the liquid so that no dry friction can occur.

It has proven advantageous to install a throttle valve in the return line next to the control valve and also a pressure relief valve for increased safety. In a further embodiment of the invention the pressure relief valve or safety valve is a control valve which, at the same time, performs the function of the safety valve. Thereby a further centralization of the mechanical elements, simplification of the design and saving of space is achieved.

The lever for manually adjusting the transmission ratio may engage the set lever by way of a shaft having an eccentric pin projecting from its face. The shaft is supported in the transmission housing. The set lever may be made pivotable about the eccentric pin. The transmission shaft and the pump shaft may be connected by means of a Cardan joint, thereby overcoming the influence of misalignments of the pump shaft relative to the transmission shaft which may be caused by inaccuracies in production.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
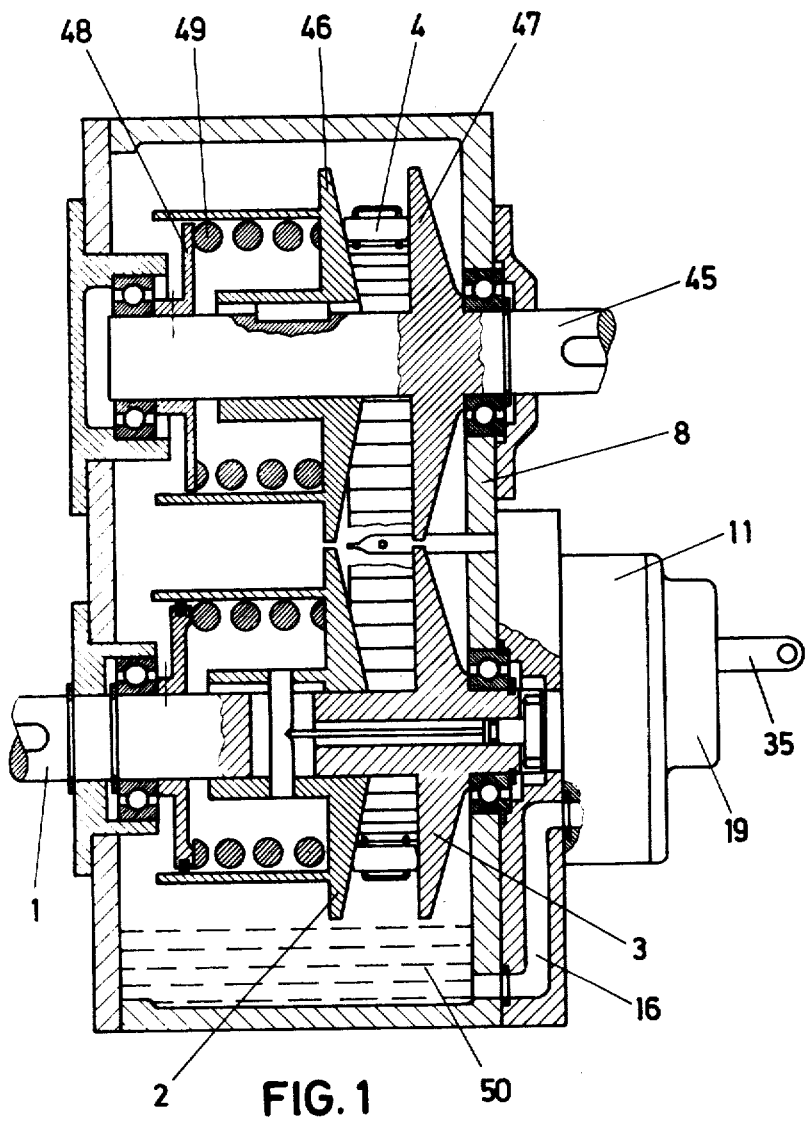
FIG. 1 is a sectional view of an infinitely variable cone pulley transmission, comprising one hydraulically controlled side.

Referring now to the drawings, the transmission shafts 1 and 45 are rotatably mounted in a transmission housing 8. The shafts carry one disc pair each, comprising the cone discs 2 and 3 on the driving side of the transmission and 46 and 47 on the driven side. Between the cone disc pairs is suspended an endless transmitting belt 4. The shaft 1 is the driving shaft of the transmission which is in a suitable manner connected to a driving motor, not shown. The cone disc 47 is displaceable on shaft 46 in the axial direction but is connected therewith for joint rotation. The cone disc 46 is under the influence of a helical coil spring 49 which rests with one end against a flange 48 which is a portion of the shaft 45. The spring 49 exerts the pressure in axial direction which is needed on the driven side of the transmission.

Figure 2:
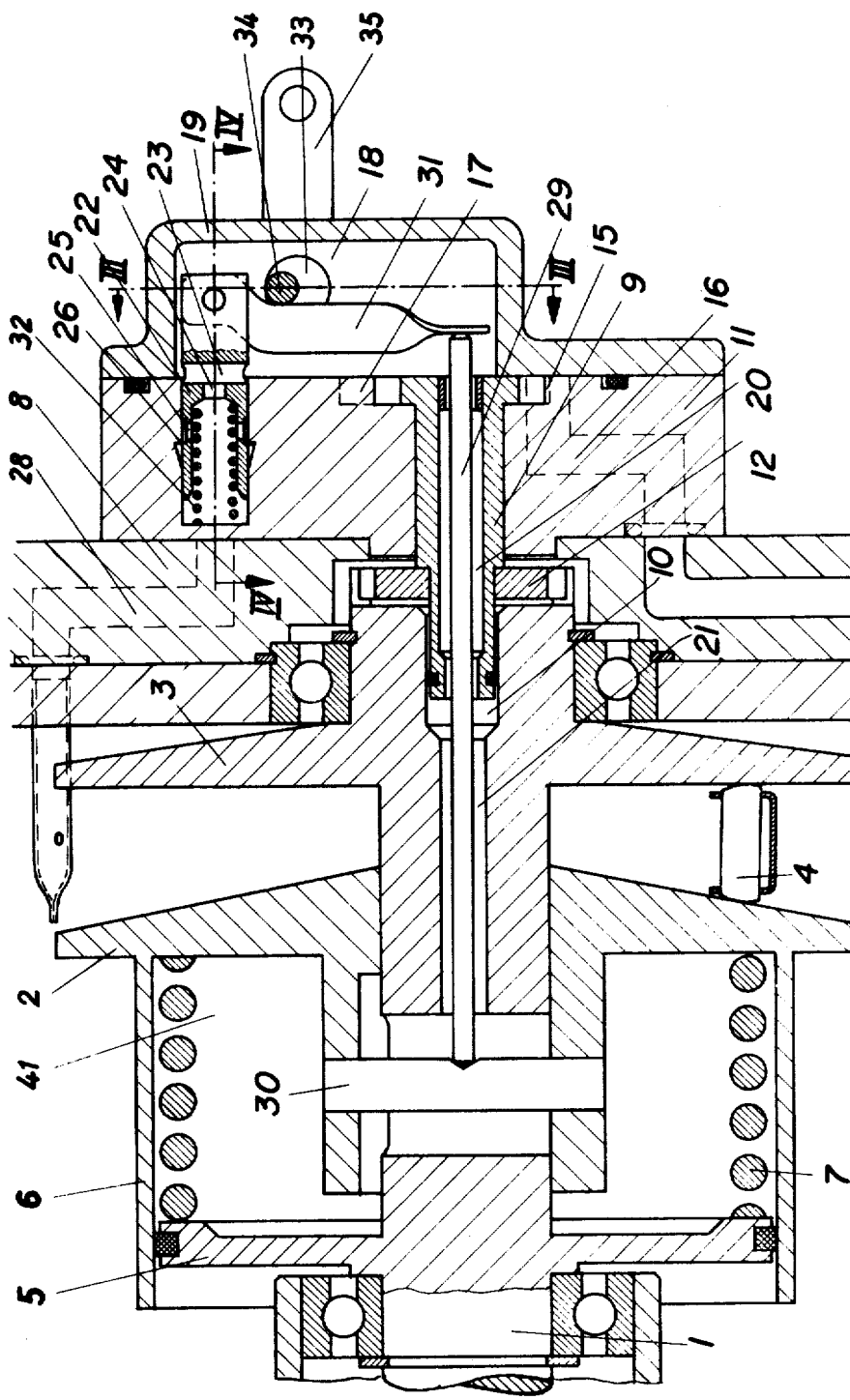
FIG. 2 shows the hydraulically controlled side of the transmission on an enlarged scale.
Figure 4:
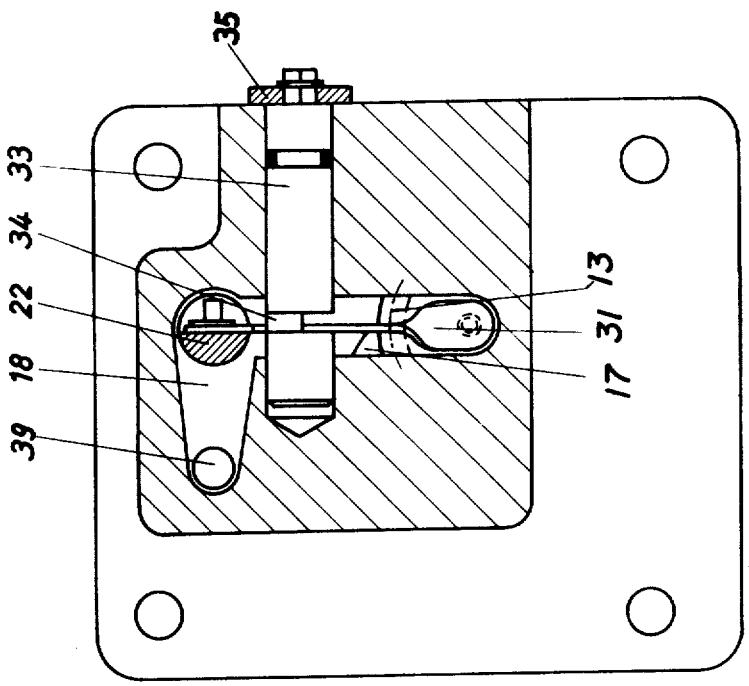
FIG. 4 is a sectional view cut along line III—III in FIG. 2.

The driving side of the transmission illustrated in FIG. 1 is explained in greater detail with reference to FIG. 2. The cone disc 3 is stationary on the shaft 1, and the cone disc 2 is axially displaceable on but rotatable with the shaft. A flange or piston 5 is a portion of the shaft 1 and a cylinder 6 is a portion of the displaceable cone disc 2. Piston 5 and cylinder 6 form together a piston-cylinder aggregate by means of which the pressure in axial direction on the transmitting belt 4 is generated which is necessary for maintaining or changing the transmission ratio. In order to keep the transmitting belt from sagging and to provide the necessary tension on the transmitting belt 4 when the transmission is at rest, when no hydraulically generated pressure is effective, a helical coil spring 7 is provided which exerts a certain counter pressure on the cone disc 2 and on the transmitting belt. This spring 7 is, of course, also effective when the transmission is not at rest, i.e., when the transmission is in operation, but then its resilient force is too small to be of any significance.

The conveyance of the hydraulic liquid, for example of hydraulic oil, from the transmission sump 50 which is formed by the housing 8 (FIG. 1) is accomplished by a gear pump. The shaft 9 of the pump is provided with a sealing element and extends into a bore 10 of the transmission shaft 1. The shaft is mounted in a pump housing 11 and is driven by the transmission shaft 1 through a claw coupling 12. As will best be discerned from FIG. 3, the gear pump comprises two gears 13 and 14. Gear 13 is carried by the pump shaft 9 while the gear 14 is supported in the pump housing 11. At 15 both gears form together the suction side of the pump. This side is in connection with the oil sump 50 through a suction line 16 which is formed by holes in the pump housing 11 and in the transmission housing 8.

Figure 5:
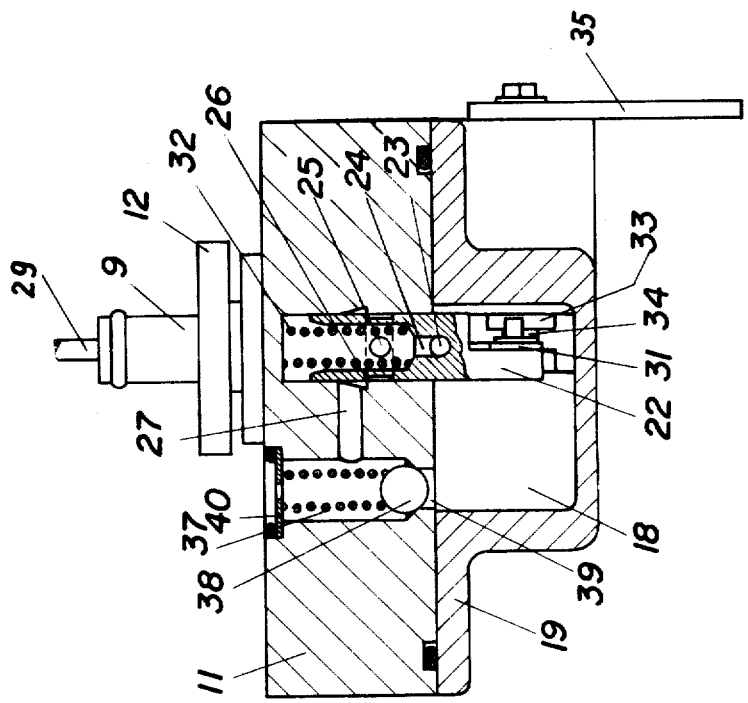
FIG. 5 is a sectional view cut along line IV—IV in FIG. 2.

The pressure side 17 of the pump is on the one hand connected with the cylinder by way of a recess 18 in a housing portion 19 and through holes 20 and 21 which extend in axial direction in the pump shaft 9 and in the transmission shaft 1 respectively. On the other hand the pressure side is through the recess 18 connected to a control valve 22 to which the hydraulic oil may pass through the lines 23, 24 and 25. In the control valve the oil passes over an edge 26 of a slide member and from there it flows through a hole 27 (FIG. 5) to the rear of a safety valve 27 which is in connection with a return line 28 formed by a hole in the transmission housing 8.

Between the axially displaceable cone disc 2 and the control valve 22 there is established a mechanical connection by a connection rod 29 which extends through the holes 20 and 21. On the one side the connection rod bears against a bar 30 which traverses a sleeve portion of the cone disc 2 and on the other side it engages a setting lever 31. The latter is linked to the slide member of the control valve 22. In order to keep these elements constantly in a backlash-free connection, the slide member of the control valve 22 is under the influence of a spring 32. The setting lever 31 is pivotable about a pin 34 which projects eccentrically from the face of a shaft 33. The shaft 33 extends through the wall of the housing 19 and a lever 35 is connected to the shaft outside of the housing. This lever provides a means for manually adjusting the position of the set lever 31 by turning the shaft 33.

Figure 3:
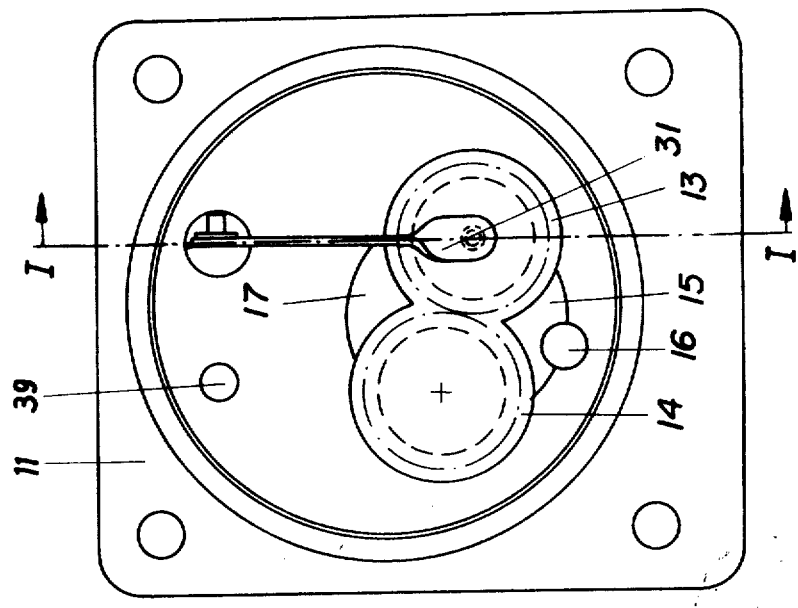
FIG. 3 is a front view of the transmission side shown in FIG. 2 with the housing which carries the lever for manually adjusting the transmission ratio removed.

The already mentioned safety valve 27 is provided in order to protect the transmission from overload. As shown in FIG. 3 the valve may for example comprise a ball 38 which is under the resilient force of a spring 37 and which, normally, closes a hole 39 in front of the recess 18 in the housing 19.

Further, it is of advantage to arrange a throttle valve 40 in the return flow of the hydraulic oil, in order to ensure in the whole hydraulic control system a minimum pressure, independently from the position which the slide member of the control valve 22 may occupy.

On the other side of the transmission, which in the described embodiment is the driven side, the necessary pressure in axial direction on the displaceable cone disc 46 is exerted by a helical coil spring 49. The latter is so dimensioned that the transmitting belt 4 is at all transmitted torques safely held between the two cone discs. This means, of course, that the clutch operates constantly under an axial pressure which is actually only necessary when the greatest torque is to be transmitted for which the transmission is designed. Since, however, the transmission is only designed for transmitting relatively small torques this may be accepted because it entails a considerable simplicity in design and, consequently, a noticeable reduction in price.

The hydraulic control device described with reference to the FIGS. 2 through 5 operates in the following manner: First let it be assumed that the transmission is adjusted to a particular transmission ratio and that it is balanced in that state. Through the suction line 16 the oil pump transports oil into the recess 18 and from there through the holes 20 and 21 into the pressure chamber 41 of the cylinder/piston aggregate, while the surplus oil flows through the control valve 22 and through the return line 28 back into the sump 50. The slide member of the control valve 22 is in a position wherein at its edge and also in the pressure chamber 41 a pressure prevails which causes the cone discs 2 and 3 to exert a clamping force on the transmitting belt 4 which conterbalances the expanding forces of the belt.

Now, in the event that the cone disc 2 moves to the right (FIG. 2) on account of changes in the torque, i.e., if the transmission adjusts itself automatically to a higher number of revolutions on the driving side, this causes a displacement of the sliding member of the control valve to the left by the bar 30, the connection rod 29, and the setting lever 31. Thus the opening in front of the edge 26 increases and more oil can flow into the return line. As a consequence the pressure in the pressure chamber 41 decreases accordingly. By the expanding force of the transmitting belt 4 the cone disc is then displaced to the left until, in connection with a corresponding backward movement of the slide member of the control valve 22 and the increase of the pressure in the pressure chamber 41 caused thereby, a balance is again established between the clamping force of the cone discs 2 and 3 and the expanding force of the belt 4. A control in the reverse sense takes place when the cone disc 2 moves to the left (FIG. 2) as the result of a change of the transmission load, i.e., when the transmission is going to adjust itself to a lower number of revolutions on the driving side. Since the control valve has a steep characteristic the hydraulic control device can react very quickly.

In the event that the transmission is to be adjusted manually for example, to a lower transmission ratio, this can be accomplished by a pivoting movement of the lever 35 (FIG. 2) in a counter clockwise direction. Thereby the pivot of the setting lever 31, which is the pin 33, is displaced to the left so that the slide member of the control valve 22 is also displaced to the left. Thereby the cross section of the return oil flow in front of the edge 26 is enlarged. Now the decrease of pressure in the pressure chamber 41 causes the cone disc 2 to yield to the left under the expanding force of the transmitting belt 4 which then rotates between the cone discs 2 and 3 along a circumference of a shorter radius. This lateral movement of the cone disc 2 comes to a stand-still when the displacement of the connection rod 29 in the same direction as the cone disc 2 and the pivoting movement of the setting lever 31 under the resilient force of the spring 32 has pushed the slide member of the control valve 22 so far to the right that the increasing pressure in the pressure room 41 again balances the expanding force of the belt 4.

Figure 6:
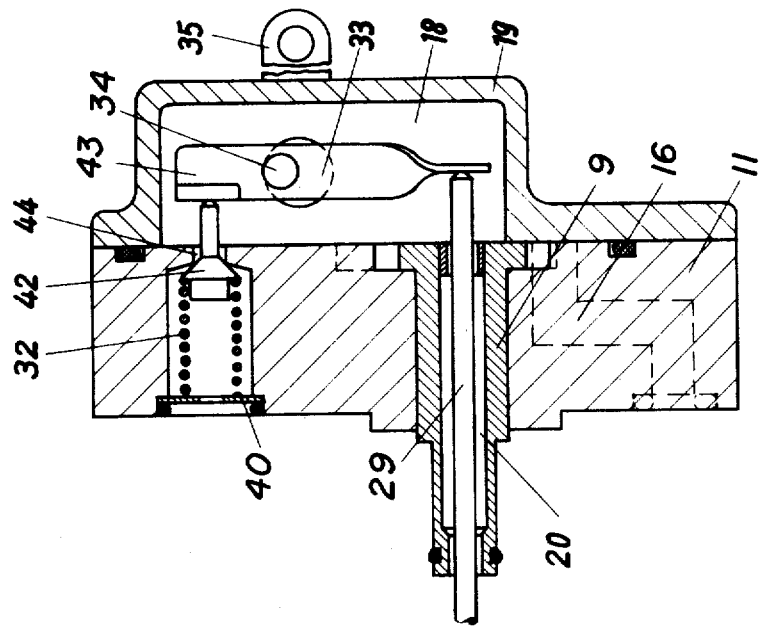
FIG. 6 shows a second embodiment of the hydraulic control device.

FIG. 6 shows an embodiment of the invented hydraulic control device with the control valve and the safety valve combined in one unit. To this end a conical valve is provided of which the valve cone is on the one hand under the pressure of a spring 32 and on the other hand under the influence of a lever 43. The lever 43 is pivotable about the pin 34 and the valve cone closes more or less an opening 44 in the return line of the hydraulic oil. Insofar the conical valve has the function of a control valve. If, however, the pressure in the chamber 41 and in the recess 18 rises to a level which corresponds to a torque which represents an overload of the transmission so that the spring on the driven side of the transmission can no longer exert a force which would prevent the belt 4 from slipping, then the conical valve can open automatically and without any command by the lever 43, provided the spring 32 is chosen properly.

What is claimed is:

1. An infinitely variable cone pulley transmission having a driving shaft and a driven shaft and a pair of conical discs on each shaft, one conical disc of each pair being laterally displaceable on the shaft and mechanically connected therewith for joint rotation, and an endless transmitting member suspended between the two pairs of conical discs, a spring operatively connected with the displaceable conical disc on one side of the transmission to urge the disc in the direction of the stationary conical disc, and hydraulic means urging the displaceable disc on the other side of the transmission in the direction of the stationary conical disc, said hydraulic means comprising:

a. a gear pump for pumping hydraulic liquid into the transmission housing, said gear pump having a housing directly attached to the transmission housing;

b. the driving shaft being provided with a bore in its axial direction and a hollow pump shaft extending through said bore into said driving shaft, and means operatively connecting the pump shaft to the driving shaft to be driven thereby;

c. means associated with the conical disc and the driving shaft forming therewith a cylinder-piston aggregate;

d. the axial bore in the driving shaft communicating with the interior of said piston-cylinder aggregate and said pump shaft being hollow and having its interior communicating with the bore in the driving shaft;

e. means for controlling the flow of hydraulic liquid to the cylinder piston aggregate including a control valve in the pump housing having a movable element;

f. a housing portion adjacent to the pump housing having a space therein, a setting lever arranged in said space, one arm of said setting lever being operatively connected with the axially displaceable conical disc on the driving shaft, and another arm being operatively connected to the movable element of the control valve, and manually settable means operatively engageable with said lever to adjust the leverage thereof;

g. passages in said transmission housing and said pump housing, for connecting the pump, the space within the housing portion, the interior of the hollow pump shaft and the control valve.

2. A transmission as claimed in claim 1, in which said control valve constitutes a relief valve for permitting the escape of fluid above a certain pressure, and in which said passages include a passage in the transmission housing communicating with the outlet of said control valve.

3. The device as claimed in claim 1, in which a rod extending through the interior of the pump shaft and the bore in the driving shaft constitutes the connection between the axially displaceable conical disc and the control lever.

4. A transmission as claimed in claim 1, further comprising a throttle valve (40) arranged downstream from the control valve.

5. A transmission as claimed in claim 1, wherein the control valve is a controllable safety valve.

6. A transmission as claimed in claim 1, wherein manually settable means includes a lever (35) turnable mounted in the housing portion on which the lever is secured, said shaft being provided with an eccentrically projecting pin about which the set lever pivots.

7. An infinitely variable cone pulley transmission as claimed in claim 1, wherein the transmission shaft and the pump shaft are interconnected by a Cardan joint.

* * * * *